(12) United States Patent
Reinhart

(10) Patent No.: US 12,091,592 B2
(45) Date of Patent: Sep. 17, 2024

(54) HOCKEY STICK TAPING SYSTEM AND METHOD

(71) Applicant: Renegade Hockey Gear, LLC, Gilbert, AZ (US)

(72) Inventor: Jeffrey Reinhart, Gilbert, AZ (US)

(73) Assignee: Renegade Hockey Gear, LLC, Gilbert, AZ (US)

( * ) Notice: Subject to any disclaimer, the term of this patent is extended or adjusted under 35 U.S.C. 154(b) by 204 days.

(21) Appl. No.: 17/945,894

(22) Filed: Sep. 15, 2022

(65) Prior Publication Data

US 2024/0093061 A1 Mar. 21, 2024

(51) Int. Cl.
| | |
|---|---|
| *A63B 59/70* | (2015.01) |
| *B29C 63/00* | (2006.01) |
| *B29C 63/04* | (2006.01) |
| *B29C 63/22* | (2006.01) |
| *B29L 31/52* | (2006.01) |
| *C09J 7/20* | (2018.01) |

(52) U.S. Cl.
CPC .............. *C09J 7/20* (2018.01); *A63B 59/70* (2015.10); *B29C 63/0073* (2013.01); *B29C 63/04* (2013.01); *B29C 63/22* (2013.01); *A63B 2209/10* (2013.01); *B29L 2031/5227* (2013.01); *C09J 2203/37* (2020.08); *C09J 2301/16* (2020.08); *C09J 2400/263* (2013.01); *C09J 2413/00* (2013.01); *C09J 2433/00* (2013.01); *C09J 2467/006* (2013.01); *C09J 2483/00* (2013.01)

(58) Field of Classification Search
CPC ......... A63B 59/70; A63B 60/56; A63B 60/62; A63B 69/0024; A63B 69/0026; A63B 2102/22; A63B 2102/24; A63B 2208/12; A63B 2209/00; A63B 2209/10; B29C 63/0073; B29C 63/02; B29C 63/04; B29C 63/22; B29C 65/48; B29C 65/4805; B29C 65/481; B29C 65/4825; B29L 2031/52; B29L 2031/5227; B32B 37/12; C09J 7/20; C09J 2203/37; C09J 2301/16; C09J 2400/263; C09J 2413/00; C09J 2433/00; C09J 2467/006; C09J 2483/00
See application file for complete search history.

(56) References Cited

U.S. PATENT DOCUMENTS

| | | | | |
|---|---|---|---|---|
| 6,213,903 B1 * | 4/2001 | Ford | ............... | A63B 60/56 473/563 |
| 2009/0324862 A1 * | 12/2009 | Wells | ............... | B29C 63/22 156/303.1 |

FOREIGN PATENT DOCUMENTS

CA 2199750 9/1998

* cited by examiner

*Primary Examiner* — Michael A Tolin
(74) *Attorney, Agent, or Firm* — SNELL & WILMER L.L.P.

(57) ABSTRACT

The system may include a sheet of tape comprised of one-piece with a second side including an adhesive surface; a backing surface removably adhered to the second side of the sheet of tape; a first edge of the sheet of tape being a straight edge; the second edge being a length from a heel area to a toe area of a blade of a hockey stick; the second edge including a concave portion shaped similar to a curve of a top of the blade; the third edge being a length from the heel area to the toe area of the blade; the third edge including a concave portion shaped similar to the curve of the top of the blade; and the fourth edge including two convex portions shaped similar to a toe of the blade.

15 Claims, 2 Drawing Sheets

HOCKEY STICK TAPING SYSTEM AND METHOD

TECHNICAL FIELD

This disclosure generally relates to a one-piece taping system and method for covering the blade of a hockey stick.

BACKGROUND

A hockey stick has three main sections, namely the stick handle (butt end), the shaft and the blade. The blade may have a heel that connects to the shaft, with the opposite end from the heel known as the toe. Many hockey players may cover one or more of these sections with hockey tape.

Hockey tape is typically comprised of a cotton and polyester blend with rubber adhesive. Depending on the desired performance, funds and availability of tape products, some hockey players may use cloth friction tape, gaffers tape, athletic tape and/or electrical tape. Hockey players typically use either white or black tape. Using black tape on the blade is known to make it harder for goalies to locate the puck during shooting. A disadvantage of black tape is that black tape with a black puck may be harder for players to track the puck during stick-handling. Using white tape may be easier for goalies to track the puck, and easier for the hockey player to track the puck using their peripheral vision, based on the contrast of the black puck against a white blade.

The hockey tape may be wrapped around the blade in a variety of ways, depending on the hockey player's style of play. The goal of wrapping the hockey tape around the blade is to wrap the blade in the desired pattern with smooth, clean, precise and consistent lines. Each wrapping of the tape should include even spacing between each wrap, while ensuring that no bumps or spaces exist. Consistency in wrapping is known to provide consistency with passes and shots. The wrapping should extend from the heel to the toe of the blade. The wrapping may be started at the heel and end at the toe. This heel-to-toe wrapping is known to slightly decrease the speed of the shot, but the wrapping may add spin to the puck that makes it difficult for goalies to control. Alternatively, the wrapping may be started at the toe and end at the heel. This toe-to-heel wrapping is known to slightly shorten the time it takes for the puck to get off the blade during shots. After picking a starting point, the tape is typically wrapped vertically across the blade, overlapping each previous wrap a little less than halfway. After the desired length of the wrapping is reached, the hockey player must cut the end and overlap the previous wrap. Most hockey players do not extend the tape job up to the shaft. Upon completion, the hockey player must then rub a hand along the tape area in the direction the tape faces to ensure that the tape is completely secured and smooth. After wrapping the tape around the blade, the blade may be rubbed down with a puck wax or stick wax. However, the wrapping of multiple windings often results in multiple uneven surfaces. Such uneven surfaces make it difficult to include indicia on the wrappings such as logos or text. While some wrapping tape may include repeated small indicia (e.g., logos, text, pictures, trademarks, etc.), such indicia may be distorted or hidden from the wrapping of the tape, or the indicia may be repeated many times on the blade. Moreover, the use of wrapping tape does not allow for larger indicia on the blade.

As shown above, the problems with wrapping the blade with tape is that the process requires a very skilled and consistent wrapping technique. Moreover, the blade may need to be wrapped before every practice or game. The blade may also need to be re-wrapped multiple times per game. The hockey players may forget to bring extra wrapping tape or run out of the wrapping tape. Certain hockey players or those with disabilities may also not have the patience, dexterity or skill to appropriately wrap or re-wrap the blade. For example, some hockey players may be very young without sufficient dexterity. The parents of the young players may not be around before or during the practice or game to help with wrapping the blades. As such, a need exists to simplify, create consistency and expedite the process of wrapping the blade of a hockey stick.

SUMMARY

In various embodiments, the system may include a sheet of tape comprised of one-piece; the sheet of tape having a first side and a second side, wherein the second side includes an adhesive surface; a backing surface removably adhered to the second side of the sheet of tape; the sheet of tape having a first edge, a second edge, a third edge and a fourth edge; the first edge being a straight edge; the second edge being a length from a heel area to a toe area of a blade of a hockey stick; the second edge including a concave portion shaped similar to a curve of a top of the blade of the hockey stick; the third edge being a length from the heel area to the toe area of the blade of the hockey stick; the third edge including a concave portion shaped similar to the curve of the top of the blade of the hockey stick; and the fourth edge including two convex portions shaped similar to a toe of the blade of the hockey stick.

In various embodiments, the first side of the sheet of tape may comprise at least one of a gripping or friction surface. The sheet of tape may be configured to cover at least a portion of the blade of the hockey stick. The first side of the sheet of tape may include indicia. The first edge may be twice a width of the heel area of the blade of the hockey stick. The concave portion of the second edge may extend about ⅔ of a length of the second edge. The concave portion of the third edge may extend about ⅔ of a length of the third edge. The respective ends of the two convex portions of the fourth edge may curve downwards and meet.

In various embodiments, the method may comprise peeling an adhesive surface of a sheet of tape off of a backing surface, wherein the sheet of tape comprises one-piece, and wherein the sheet of tape has a first edge, a second edge, a third edge and a fourth edge; aligning a middle section of the first edge with a heel of a blade of a hockey stick; aligning the fourth edge with a bottom of a toe of the blade of the hockey stick; folding the adhesive surface of the sheet of tape around a bottom of the blade; adhering the second edge and the third edge over a top of the blade; and adhering the fourth edge past the toe of the hockey stick. In various embodiments, the method may further comprise trimming any excess material from the second edge and the third edge off the top of the blade. In various embodiments, the method may further comprise trimming any excess material from the fourth edge off the toe of the blade.

BRIEF DESCRIPTION OF THE DRAWINGS

The accompanying drawings, wherein like numerals depict like elements, illustrate exemplary embodiments of the present disclosure, and together with the description, serve to explain the principles of the disclosure. In the drawings.

DETAILED DESCRIPTION

Figure 1:
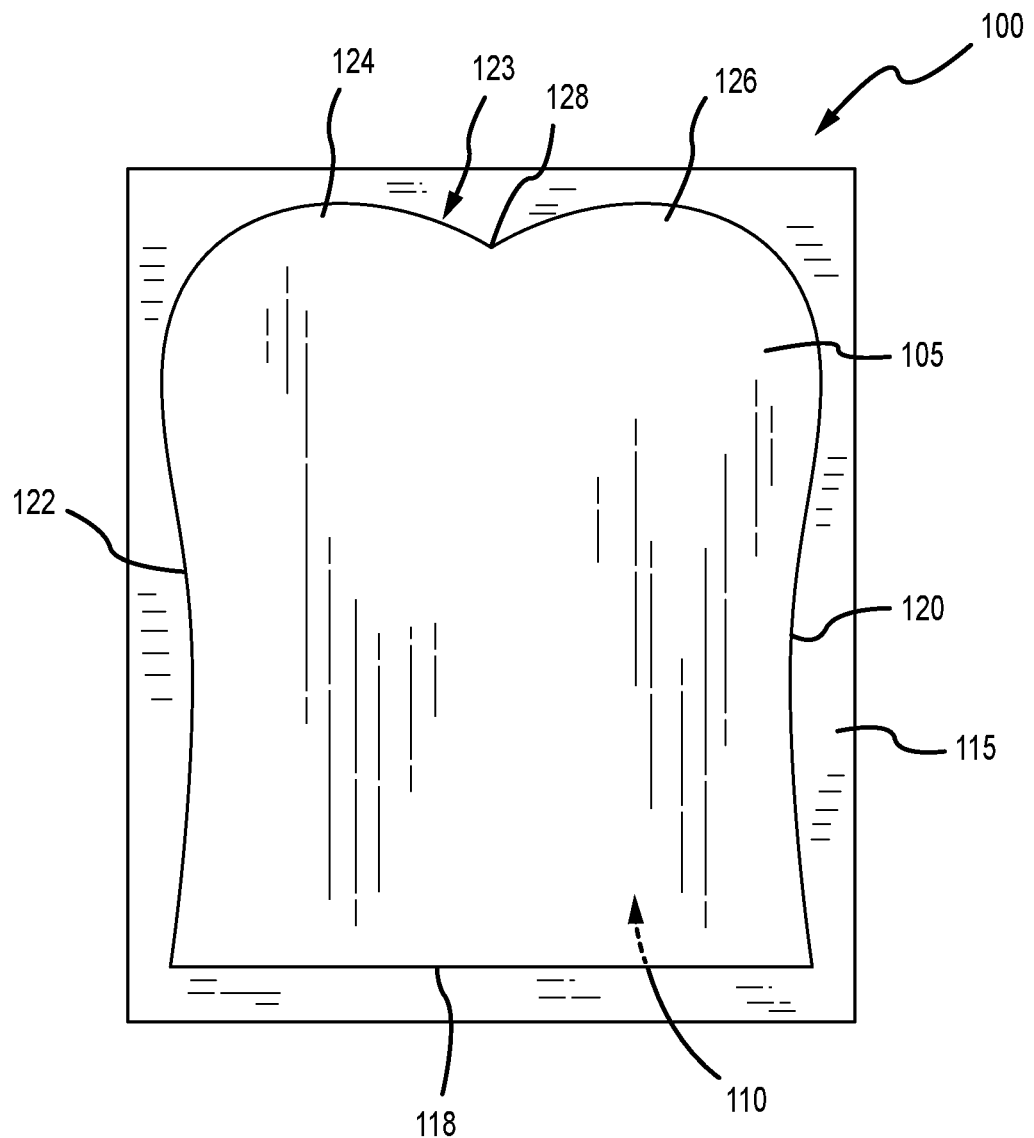
FIG. 1 illustrates the system comprising the hockey tape pattern with one side adhered to a backing, in accordance with various embodiments.

In various embodiments, as set forth in FIG. 1, the system 100 may include sheet of tape having a first side 105 comprised of a gripping or friction surface and a second side 110 comprised of an adhesive surface. The sheet of tape may be one-piece and cover all or any portion of the blade of a hockey stick. The first side 105 may be comprised of cotton, polyester, a cotton and polyester blend, rubber or any material that provides friction.

The second side 110 may be comprised of a rubber, acrylic and/or silicone adhesive. The second side 110 of the tape may be removably adhered to a backing surface 115. The backing surface 115 may be plastic, acrylic and/or silicone. The backing surface 115 may be any size, any shape and/or in the form of a sheet. For example, the backing may be about 8 inches by 11 inches. The backing surface 115 may comprise one or more surfaces that partially or fully cover the second side of the tape. The sheet of the backing surface 115 may be the same size or larger than the sheet of tape. The sheet of the backing surface 115 being the same size or larger than the sheet of tape allows for the sheet of tape to fit within the boundaries of the sheet of the backing surface 115 and allows for the user to peel up the sheet of tape from the backing surface 115.

The first side 105 of the sheet of tape and/or the silicone backing surface 115 may be any color or multiple colors. As stated above, the most common colors for hockey tape are white or black. The surface of the first side 105 of the sheet of tape may comprise any indicia such as, for example, one or more of a graphic, text, logo, hologram, photo, artwork, slogans, motivational statement or advertisement. The indicia may be printed using ultraviolet, ink, laser and/or flexographic printing. The logos may include professional sports team logos. Either side or both sides of the silicone backing surface 115 may also comprise any indicia. The indicia may be created within the surface, printed on the surface or added to the surface at a later time. The first side 105 of the sheet of tape and/or the silicone backing surface 115 may comprise a material that allows markers to be erasable (similar to a white board). As such, a coach or player may draw certain targets or arrows on the surfaces for practice purposes.

In various embodiments, and with continued reference to FIG. 1, the sheet of tape may be generally in a rectangular shape. The generally rectangular dimensions of the sheet of tape may be about 10 inches by 7 inches. Any of the dimensions discussed herein may be different or adjusted to fit different size hockey stick blades (e.g., goalie, kids, adults, etc.). Moreover, the system may be used for any other sporting equipment, kitchen equipment, tools, etc. For example, the system may cover any portion of cricket rackets, baseball bats, tennis racquets, pickleball racquets, rolling pins, etc.

The sheet of tape may include a first edge 118, a second edge 120, a third edge 122 and a fourth edge 123. In various embodiments, the first edge 118 may be any length and any shape. The first edge 118 may comprise a straight edge. The length of the first edge 118 may be any length. The length of the first edge 118 may be twice the width of the heel portion of the blade of the hockey stick. For example, the length of the first edge 118 may be about 7 inches.

In various embodiments, the second edge 120 may be any length and any shape. The second edge 120 may be the length from the heel area to the toe area of the blade. For example, the second edge 120 may be about 10 inches. The second edge 120 may include a concave portion. The concave portion of the second edge 120 may extend about ⅔ of the length of the second edge 120. For example, the concave portion of the second edge 120 may curve inward about 0.5 inches. The concave portion of the second edge 120 may include a similar curve as the top of the blade of a hockey stick. For example, concave portion of the second edge 120 may be about 0.10 to 0.30 arch length.

In various embodiments, the third edge 122 may be any length and any shape. The third edge 122 may be the length from the heel area to the toe area of the blade. For example, the third edge 122 may be about 10 inches. The third edge 122 may include a concave portion. The concave portion of the third edge 122 may extend about ⅔ of the length of the third edge 122. For example, the concave portion of the third edge 122 may curve inward about 0.5 inches. The innermost points of the concave portion of the third edge 122 and the concave portion of the second edge 120 may be about 6.5 inches apart. The concave portion of the third edge 122 may include a similar curve as the top of the blade of a hockey stick. For example, concave portion of the third edge 122 may be about 0.10 to 0.30 arch length.

In various embodiments, the fourth edge 123 may be any shape and any length. The fourth edge 123 may comprise sections 124, 126 and 128. Sections 124 and 126 may include convex portions. Respective ends of each of the convex portions may curve downwards and may meet at point 128. Sections 124 and 126 of the fourth edge 123 may include a similar curve as the toe area of the blade. For example, sections 124 and 126 of the fourth edge 123 may be about 7 inches wide. The peaks of sections 124 and 126 of the fourth edge 123 may be about 3 inches apart. Point 128 may be about 0.5 inches below the peaks of sections 124 and 126.

Figure 2:
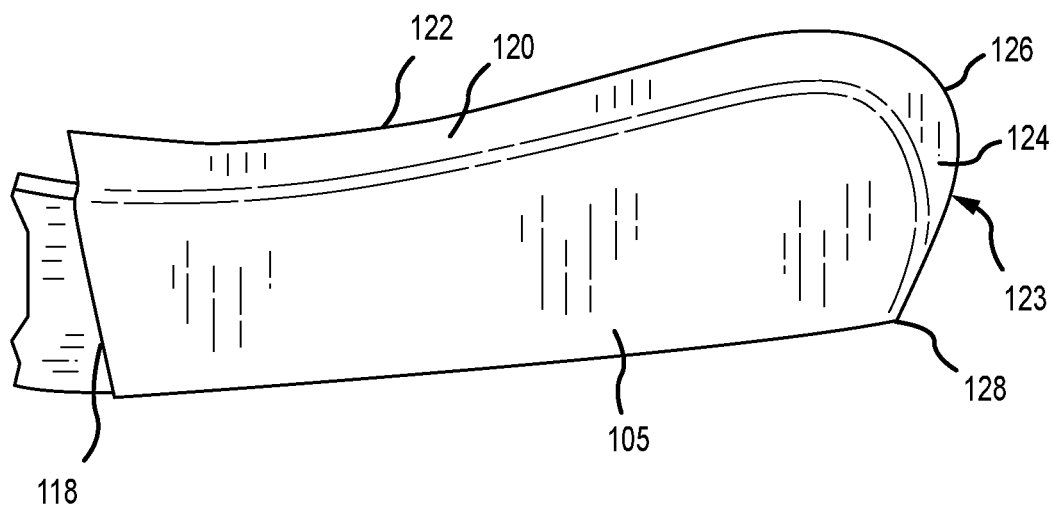
FIG. 2 illustrates the hockey tape pattern folded around and over the hockey stick blade, in accordance with various embodiments.

In various embodiments, and with reference to FIGS. 1 and 2, the method may comprise peeling the sheet of tape off of the backing surface 115. The user may bring the adhesive second side 110 close to the blade of the hockey stick. The user may then align the middle section of the first edge 118 with the heel of the blade of the hockey stick and section 128 of the fourth edge 123 with the bottom of the toe of the blade of the hockey stick. The user then folds the first side 105 of the sheet of tape around the bottom of the blade such that the second edge 120 and third edge 122 meet over the top of the blade. Sections 124 and 126 also meet past the toe of the hockey stick. The user may adhere the second edge 120 and third edge 122 over the top of the hockey stick. The user may also adhere sections 124 and 126 past the toe of the hockey stick. The user may then trim any excess material from the second edge 120 and the third edge 122 off the top of the blade. The user may also trim any excess material from sections 124 and 126 off the toe of the blade. The user may use a scissor to trim, and the process of trimming may also form a seal around the toe and blade of the hockey stick.

In various embodiments, the method may include folding the first side 105 of the sheet of tape around the top of the blade such that the second edge 120 and third edge 122 meet on the bottom of the blade. In this embodiment, the edges may be shaped accordingly to conform to the edges of the blade. In various embodiments, the method may include folding the first side 105 of the sheet of tape around the toe of the blade such that the first edge meets the heel and the second edge 120 and third edge 122 meet above or below the blade.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
    peeling an adhesive surface of a sheet of tape having an adhesive off of a backing surface of a backing, wherein the sheet of tape comprises one-piece, and wherein the sheet of tape has a first edge, a second edge, a third edge and a fourth edge;
    aligning a middle section of the first edge with a heel of a blade of a hockey stick;
    aligning the fourth edge with a bottom of a toe of the blade of the hockey stick;
    folding the adhesive surface of the sheet of tape around a bottom of the blade;
    adhering the second edge and the third edge over a top of the blade; and
    adhering the fourth edge past the toe of the hockey stick.

2. The method of claim 1, further comprising trimming any excess material from the second edge and the third edge off the top of the blade.

3. The method of claim 1, further comprising trimming any excess material from the fourth edge off the toe of the blade.

4. A system comprising:
    a sheet of tape comprised of one-piece;
    the sheet of tape having a first side and a second side, wherein the second side includes an adhesive having an adhesive surface;
    a backing having a backing surface removably adhered to the second side of the sheet of tape;
    the sheet of tape having a first edge, a second edge, a third edge and a fourth edge;
    the first edge being a straight edge;
    the second edge being a length from a heel area to a toe area of a blade of a hockey stick;
    the second edge including a concave portion shaped similar to a curve of a top of the blade of the hockey stick;
    the third edge being a length from the heel area to the toe area of the blade of the hockey stick;
    the third edge including a concave portion shaped similar to the curve of the top of the blade of the hockey stick; and the fourth edge including two convex portions shaped similar to a toe of the blade of the hockey stick.

5. The system of claim 4, wherein the first side of the sheet of tape comprises at least one of a gripping or friction surface.

6. The system of claim 4, wherein the sheet of tape is configured to cover at least a portion of the blade of the hockey stick.

7. The system of claim 4, wherein the first side of the sheet of tape includes indicia.

8. The system of claim 4, wherein the first edge is twice a width of the heel area of the blade of the hockey stick.

9. The system of claim 4, wherein the concave portion of the second edge extends about ⅔ of a length of the second edge.

10. The system of claim 4, wherein the concave portion of the third edge extends about ⅔ of a length of the third edge.

11. The system of claim 4, wherein respective ends of the two convex portions of the fourth edge curve downwards and meet.

12. The system of claim 4, wherein the sheet of tape is about 10 inches by 7 inches.

13. The system of claim 4, wherein the fourth edge including two convex portions is about 7 inches in length.

14. The system of claim 4, wherein the concave portion of the second edge curves inward about 0.5 inches along the concave portion.

15. The system of claim 4, wherein the concave portion of the third edge curves inward about 0.5 inches along the concave portion.

\* \* \* \* \*